United States Patent
Soltanian et al.

(10) Patent No.: US 11,351,988 B2
(45) Date of Patent: Jun. 7, 2022

(54) USE OF SOUND WITH ASSISTED OR AUTONOMOUS DRIVING

(71) Applicant: Byton North America Corporation, Santa Clara, CA (US)

(72) Inventors: Baharak Soltanian, Mountain View, CA (US); Man Chun Tsang, Daly City, CA (US); Srini Gowda, Solihull (GB); Dirk Abendroth, Mountain View, CA (US)

(73) Assignee: Byton North America Corporation, Santa Clara, CA (US)

( * ) Notice: Subject to any disclaimer, the term of this patent is extended or adjusted under 35 U.S.C. 154(b) by 0 days.

(21) Appl. No.: 16/046,202

(22) Filed: Jul. 26, 2018

(65) Prior Publication Data
US 2020/0031337 A1    Jan. 30, 2020

(51) Int. Cl.
*G08G 1/0967* (2006.01)
*G08G 1/09* (2006.01)
(Continued)

(52) U.S. Cl.
CPC .......... *B60W 30/09* (2013.01); *B60W 10/184* (2013.01); *B60W 10/20* (2013.01); *B60W 30/0956* (2013.01); *B60W 50/14* (2013.01); *G05D 1/0088* (2013.01); *G05D 1/0223* (2013.01); *G05D 1/0246* (2013.01); *G05D 1/0248* (2013.01); *G05D 1/0255* (2013.01); *G05D 1/0257* (2013.01); *G05D 1/0289* (2013.01); *G06V 20/58* (2022.01); *H04R 1/406* (2013.01); *B60W 2050/146* (2013.01); *B60W 2420/403* (2013.01); *B60W 2420/42* (2013.01); *B60W 2420/52* (2013.01); *B60W 2420/54* (2013.01); *B60W 2420/60* (2013.01); *B60W 2554/801* (2020.02); *B60W 2554/804* (2020.02); *B60W 2555/20* (2020.02); *B60W 2720/10* (2013.01); *B60W 2720/24* (2013.01)

(58) Field of Classification Search
None
See application file for complete search history.

(56) References Cited

U.S. PATENT DOCUMENTS

| 8,676,427 | B1 * | 3/2014 | Ferguson | B60W 10/20 |
| | | | | 701/23 |
| 2004/0090319 | A1 * | 5/2004 | Kimura | G08G 1/166 |
| | | | | 340/435 |

(Continued)

FOREIGN PATENT DOCUMENTS

| JP | 06328980 A | 11/1994 |
| JP | 08305983 A | 11/1996 |

(Continued)

OTHER PUBLICATIONS

The International Search Report and Written Opinion of the International Searching Authority for PCT Application No. PCT/CN2019/097786 dated Oct. 25, 2019, 8 pages.

*Primary Examiner* — Adam D Tissot
(74) *Attorney, Agent, or Firm* — Womble Bond Dickinson (US) LLP (57) ABSTRACT

A vehicle includes a set of sound sensors coupled to one or more processing systems that process sound data from the set of sound sensors in order to provide assisted driving features or functionality such as an emergency vehicle avoidance.

24 Claims, 5 Drawing Sheets

(51) Int. Cl.
*B60W 30/09* (2012.01)
*H04R 1/40* (2006.01)
*B60W 10/184* (2012.01)
*B60W 10/20* (2006.01)
*B60W 30/095* (2012.01)
*B60W 50/14* (2020.01)
*G05D 1/00* (2006.01)
*G05D 1/02* (2020.01)
*G06V 20/58* (2022.01)

(56) References Cited

U.S. PATENT DOCUMENTS

2015/0210258 A1* 7/2015 Erdem ................ B60T 8/00
                                            701/29.2
2017/0213459 A1* 7/2017 Ogaz ................ G08G 1/166

FOREIGN PATENT DOCUMENTS

JP       2013206155 A   10/2013
JP          5526643 B2    6/2014

* cited by examiner

USE OF SOUND WITH ASSISTED OR AUTONOMOUS DRIVING

BACKGROUND

This disclosure relates to the field of vehicles, such as automobiles that travel on roads along with emergency vehicles such as ambulances, fire trucks and police cars.

Emergency vehicles are often required to travel along roads in less than ideal conditions that require the emergency vehicles to travel through a red light or otherwise violate normal traffic safety rules in order to reach a destination, such as a burning building, as quickly as possible. Emergency vehicles use lights and audible sounds such as sirens to warn other vehicles to stay clear of the path of travel of the emergency vehicles. While such lights and sounds do often work and cause the other vehicles to avoid the emergency vehicles, there are, unfortunately, many instances when an emergency vehicle collides with another vehicle. This has an impact not only on the victims in the collision but also on the people involved in the emergency that invoked a response from the emergency vehicle.

Future vehicles in development may use a system of interconnected vehicles that allow an emergency vehicle, such as a fire truck, to send radiofrequency messages to other vehicles to notify the other vehicles, through such messages, that the emergency vehicle is traveling along a road and the other vehicles should yield the right of way to the emergency vehicle. While such a system may work, it requires the development of standards for the messages so that the other vehicles can properly receive and evaluate the messages. This will require the cooperation of emergency services and the manufacturers of vehicles to develop the initial standards and rules of operation, etc. and will require continued cooperation amongst the vehicle manufacturers and the emergency services. Moreover, this will require an allocation of the radio spectrum, if available, which prevents the future use of the allocated radio spectrum for other services.

SUMMARY OF THE DESCRIPTION

The embodiments described herein use sound sensors, such as microphones or MEMs sensors, to detect sounds that are used to provide assisted driving features or functionalities such as one or more warnings or autonomous driving functionality beyond the one or more warnings. For example, a method in one embodiment can detect exterior sounds, such as a siren of an emergency vehicle, and provide a warning about the emergency vehicle; the warning can be a warning displayed on a display device in front of the driver (or other occupant) in the vehicle or be an audible warning played over speakers in the vehicle (or be both a visual and audible warning) and the warning can indicate the direction of arrival and estimated time of arrival of the emergency vehicle. In one embodiment, the method can also include automatically reducing the volume of a media player (for example, radio or MP3 player) inside of the vehicle to allow the occupants of the vehicle to hear the siren of the emergency vehicle. The method, in one embodiment, can also include determining when the vehicle should act autonomously because the driver has not taken proper action based on the warning (for example, the driver has ignored the warning or has not seen it, etc.); in one embodiment, an assisted driving system of the vehicle can compare the time needed to pull the vehicle over to the side of the road and stop the vehicle relative to the time estimated for when a collision with the emergency vehicle may occur, and the autonomous or assisted driving system can automatically take control of the vehicle (and pull it over to the side of the road and stop it) before the estimated time of collision in sufficient time to allow the autonomous or assisted driving system to stop the vehicle on the side of the road. In one embodiment of this method, the exterior sounds are detected by a set of microphones on the exterior of the vehicle; for example, the set of microphones can be aligned in a circular array. In one embodiment, the circular array can surround the shark fin antenna on top of the vehicle.

In one embodiment, a method can detect and recognize sounds from other objects outside of the vehicle such as motorcycles or people or weather events such as rain and can cause autonomous or assisted driving functionality to be implemented in response to the detection of such exterior sounds. For example, the detection and recognition of the sound of a motorcycle or other vehicle which is approaching the vehicle, while the vehicle is stopped or moving, can cause the autonomous or assisted driving system to warn the driver to not change lanes while the motorcycle or other vehicle is approaching or the autonomous driving system can prevent the driver from attempting to change lanes while the motorcycle is approaching. The detection of the sounds of the motorcycle or other vehicle can be combined with images from one or more cameras and data from a LIDAR sensor to confirm the presence of the motorcycle or other vehicle. Similarly, the detection of exterior sounds from people in the vicinity of the vehicle can cause other components of the vehicle (e.g., cameras, radar, or LIDAR) to perform assisted driving functions or features such as attempting to detect the location of the people and visually detect the people making the sounds in order to prevent a collision between the people and the vehicle. Similarly, the sound of rain can be used to cause assisted driving features to be invoked in response to the rain; for example, the detection of rain from the sound of rain can be used to change the manner of operation of the braking system or steering system to adjust for potentially different road conditions as a result of the rain.

In one embodiment, sound sensors can be used with other sensors such as a LIDAR sensor, radar sensors, and cameras to provide assisted driving or autonomous driving. For example, LIDAR and/or radar can be used to capture ranging data that can be used to determine distance to the emergency vehicle or other vehicle or object and can also be used to determine the direction of travel of the emergency vehicle or other vehicle or object. The sound sensors can be used to obtain sound data from which a Doppler effect can be determined, and the Doppler effect can be used to derive a velocity or speed of the emergency vehicle or object that is the source of the siren or other sound. The speed and distance of the emergency vehicle can be used to determine a time of collision if the vehicle does not stop or change its direction. The cameras can be used to capture images of flashing lights on the emergency vehicle that can be used to confirm the distance and direction of travel of the emergency vehicle.

In one embodiment of the invention, a method can include the following operations: detecting, using exterior sound sensors, sounds from an emergency vehicle or other vehicle or object; activating a camera and/or a LIDAR sensor and/or radar sensors for emergency vehicle avoidance or other assisted driving functionality; detecting flashing lights in images from the camera; determining a distance from LIDAR and/or radar ranging data; determining a direction of arrival and if possible a time of arrival of the emergency vehicle; presenting a warning of the approaching emergency vehicle, where the warning can include a warning on a display screen and also announcing the warning through the vehicle's speakers; the method can also include providing autonomous driving to control the vehicle to cause it to pull over to the side of the road and stop.

In another embodiment of the invention, a method can include the following operations: measuring a Doppler effect of a known or predetermined sound of other vehicles or objects; determining a location of the sound source (e.g. an ambulance or fire truck) using for example sparse component analysis; activating, through for example an API, camera sensors and radar sensors and/or a LIDAR sensor to determine if possible a distance to the other vehicle or object from the ranging data; using the speed of the vehicle such as the speed obtained from the Doppler effect, and the distance obtained through the ranging data to calculate the time of arrival and using the sparse component analysis to determine the direction of arrival. The method can also include presenting a warning to the driver and determining whether it is time to take action by an autonomous driving system when the driver does not heed the warning.

In one embodiment a vehicle can include one or more data processing systems that are coupled to a LIDAR sensor and/or radar sensors and camera sensors and external sound sensors mounted on the exterior of the car to capture sounds from outside of the car. The vehicle can further include one or more motors (e.g. electric motors powered by batteries) and braking systems coupled to wheels to allow the vehicle to move along the road. The vehicle can also include data about predetermined sounds such as data indicating frequencies of various different types of sirens used on emergency vehicles. The data processing systems can be configured with software to provide processing algorithms that perform the one or more methods described herein to provide for the use of sounds in conjunction with assisted driving features and functionalities.

The methods and vehicles described herein can include non-transitory machine readable media that store executable computer program instructions that can cause one or more data processing systems to perform the one or more methods described herein when the computer program instructions are executed. The vehicles described herein can be powered by internal combustion engines (e.g. gasoline or diesel powered engines) or electric motors (e.g. battery powered electric motors) or hybrid systems that include internal combustion engines and electric motors or other types of engines or sources of energy. This summary does not include an exhaustive list of all embodiments in this disclosure. The vehicles and methods described herein can be practiced from all suitable combinations of the various aspects and embodiments summarized above and also those disclosed in the detailed description below.

All systems and methods can be practiced from all suitable combinations of the various aspects and embodiments summarized above, and also those disclosed in the Detailed Description below.

BRIEF DESCRIPTION OF THE DRAWINGS

The present embodiments are illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
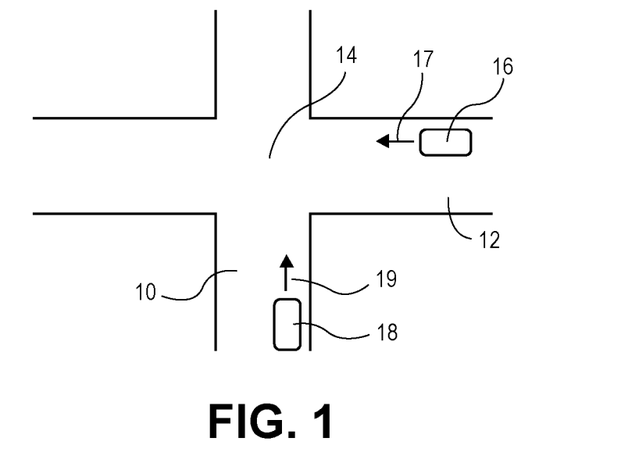
FIG. 1 (FIG. 1) shows an example of an intersection of two roads being used by a vehicle and an emergency vehicle.

FIG. 1 shows an example of two roads which include an intersection 14 at a junction of the two roads. As shown in FIG. 1, the vehicle 18 is traveling in the direction 19 along road 10 and will soon be entering the intersection 14. The emergency vehicle 16, which can be a fire truck or an ambulance or a police car is traveling in the direction 17 along the road 12 and will soon be in the intersection 14. If both vehicles continue driving in their direction, a collision may occur. In many situations, the emergency vehicle 16 will attempt to cross through the intersection 14 while the traffic light facing the emergency vehicle 16 is red which means that the traffic light facing the vehicle 18 is green. If the driver of the vehicle 18 does not hear the siren of the emergency vehicle 16 and sees only the green light in the intersection 14, the driver of the vehicle 18 may attempt to cross the intersection 14 at the same time that the fire truck 16 is crossing the intersection 14 thereby causing a collision. The embodiments described herein provide methods and vehicles to prevent that collision by providing warnings and if necessary assisted driving or autonomous driving to avoid a collision with an emergency vehicle. Further, in other embodiments, the methods and vehicles described herein can use one or more exterior sound sensors to provide other types of assisted driving or autonomous driving as further described herein.

Figure 2:
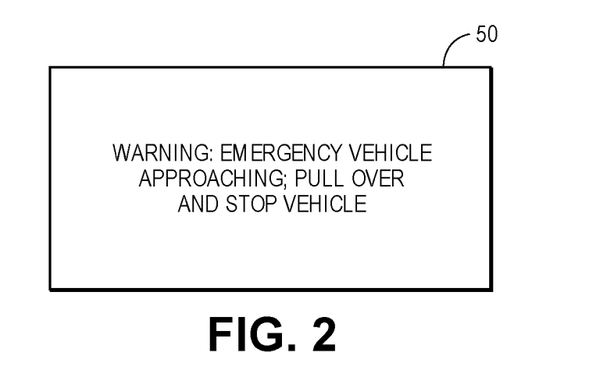
FIG. 2 (FIG. 2) shows an example of a warning which can be presented according to the one or more embodiments described herein.

In the one or more embodiments described herein, a warning can be presented to the driver of the vehicle 18 before entering the intersection 14. FIG. 2 shows an example of such a warning on a display device 50 in the vehicle 18. In one embodiment, the warning can be shown on a display device and also be presented over one or more speakers within the passenger cabin of the vehicle. In one embodiment, an assisted driving function can also include reducing the volume of a media player or radio in the passenger compartment of the vehicle to allow the passengers and drivers of the vehicle to hear the siren of the emergency vehicle. The volume of the media player or radio can be reduced while the warning is displayed and while the system is determining that an emergency vehicle is present or some other situation requiring assisted driving is also present. In one embodiment, a processing system in the vehicle can use noise cancelling to cancel noise, from inside the vehicle, in the data from the set of exterior sound sensors.

Figure 3:
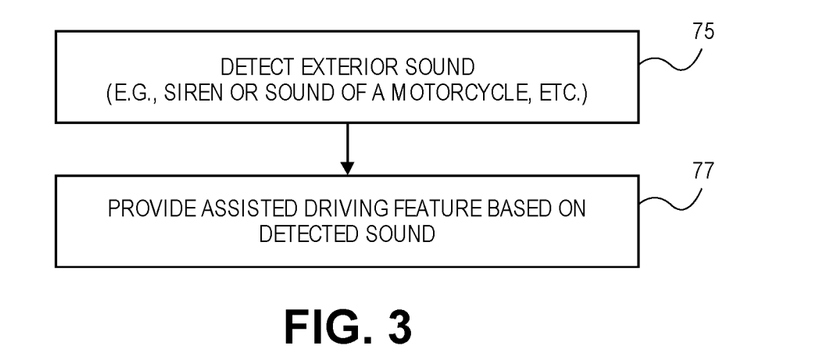
FIG. 3 (FIG. 3) shows a flowchart which illustrates a method according to one embodiment of the present invention.
Figure 8A:
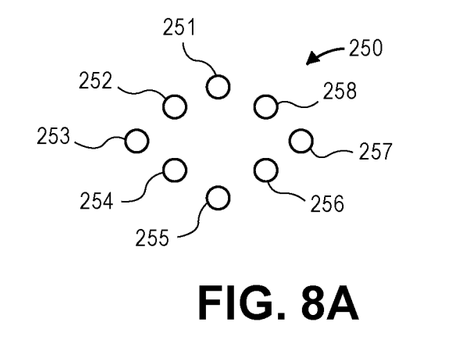
FIG. 8A (FIG. 8A) shows an example of a circular arrangement of sound sensors on the exterior of the vehicle according to one embodiment described herein.
Figure 8B:
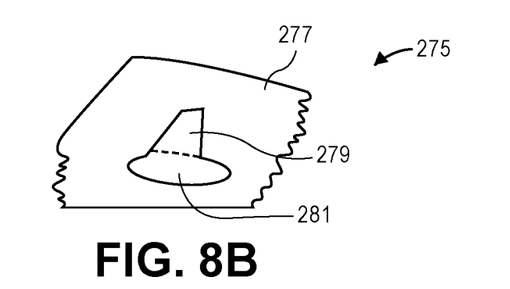
FIG. 8B (FIG. 8B) shows an example of a circular arrangement of microphones on a shark fin antenna on a top of the vehicle according to one embodiment described herein.
Figure 8C:
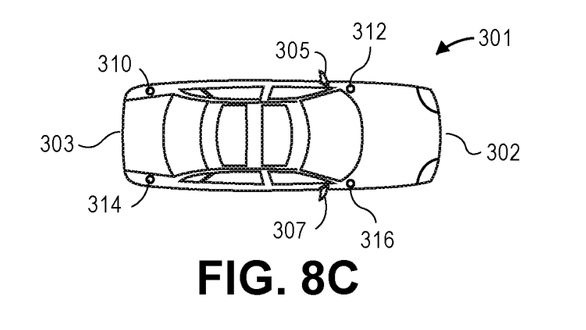
FIG. 8C (FIG. 8C) shows another arrangement of exterior microphones that provide sound sensing capability for a vehicle, such as an SUV or car.

FIG. 3 shows a general method according to one embodiment which uses the detection of exterior sounds through, for example, exterior microphones on the exterior of the vehicle. FIGS. 8A, 8B, and 8C show examples of various arrangements of exterior microphones which can be used in various embodiments. Referring back to FIG. 3, operation 75 involves the detection of exterior sounds through the use of one or more sound sensors, such as the sound sensors described relative to FIGS. 8A, 8B, and 8C. For example, the exterior sound sensors can collect sound data which is then processed to determine that a siren of an emergency vehicle has been detected or the sound of a motorcycle has been detected or the sound of people talking near car has been detected, etc. The sound sensors can be coupled to a set of one or more processing systems that include one or more sound recognition systems or algorithms that are configured to recognize sounds, such as sounds of sirens on emergency vehicles. For example, sound recognition systems or algorithms can be trained or configured to recognize the sound patterns of the sirens of emergency vehicles where the vehicle may operate. These sirens have known, predetermined sound patterns at known frequencies such as a repeating pattern (over time) of known frequencies and at known relative amplitudes (relative within the repeating pattern). Known and existing sound recognition systems can be configured or trained to recognize the various repeating sound patterns of emergency vehicle sirens, and this recognition functionality can extend to the identification of a particular type of siren so that the sound recognition system or algorithm can distinguish between a fire truck's siren and a police vehicle's siren and an ambulance's siren in one embodiment. Further, in one embodiment, the sound recognition systems or algorithms can be enhanced with the use of noise cancellation systems or algorithms that cancel at least some of the noise from the interior of the vehicle (using microphones in the interior of the vehicle to receive sounds coming from the interior); this cancellation can use data about the sounds coming from the interior of the vehicle to cancel noise from the interior in the sound data from the exterior sound sensors so that the processing system(s) can focus on processing primarily the sounds from the exterior of the vehicle. The noise cancellation can improve the recognition of exterior sounds, particularly if the recognition system is attempting to recognize human speech from pedestrians near the vehicle. Further, in one embodiment, the sound recognition systems or algorithms can be enhanced using the known solutions to the "cocktail party problem" where there are multiple sources of noise surrounding the vehicle; such solutions can be used to filter out, for example, sounds that are not from emergency vehicles to enhance detection and recognition of the sirens on emergency vehicles and such solutions can be provided by a neural network trained with deep learning techniques.

One or more data processing systems within the vehicle can receive the sound data from the sound sensors and process that data along with potentially other data to then provide assisted driving features or functionality based on the detected sound. For example, a warning can be provided to the driver that an emergency vehicle has been detected. In one embodiment, the data processing system can gather sensor data from various sensors including the sound sensors to determine the direction of travel of the emergency vehicle and the distance of the emergency vehicle and the speed of the emergency vehicle and from the direction, distance and speed calculate an estimated time of collision and present a warning to the driver that a collision is likely to occur. In one embodiment, a circular array or other arrays of microphones on the exterior of the vehicle can be used to determine the direction of the sound source (such as an angle relative to the direction of travel of the vehicle) which can then be used to determine the direction of travel of the emergency vehicle. As described further below, the array of microphones can be used to determine the angle, in a two-dimensional plane, of the direction of the source of sound by evaluating the difference in time of receipt of the same sound data from the source(s) of sound at different microphones in the array. This evaluation can be done repeatedly over time to provide a time dependent trace of the angle (and hence direction) of the source of a sound such as an emergency vehicle's siren. In one embodiment, the output of sound data form the array of microphones is well synchronized in time so that a processing system can assume that a difference in time between the receipts at different microphones is due to the amount of time it took the sound to travel between the different microphones rather than a lack of synchronization. In one embodiment, the Doppler effect of the sound from the sound source can also be used to determine the speed of the emergency vehicle. In one embodiment, the distance of the emergency vehicle can be determined from ranging data from a LIDAR sensor or one or more radar sensors.

In some embodiments, operation 77 can provide other types of assisted driving features such as warnings against lane changes when the sound sensors detect sounds of adjacent vehicles such as an adjacent motorcycle which is approaching the vehicle. Motorcycles produce known sounds that can be recognized by known sound recognition systems and/or algorithms, and the recognition of the sound of a motorcycle can be used in the embodiments of assisted driving described herein. For example, many times when cars are stopped along a road because of a traffic jam, motorcycles will attempt to drive between the cars in order to avoid the traffic jam. This can present a hazard to both the cars and the motorcycles when a driver of a car attempts to make a lane change as the motorcycle approaches. The detection of the sounds of the motorcycle or other vehicle can be combined with images from one or more cameras and data from a LIDAR sensor to confirm the presence of the motorcycle or other vehicle. The images can be processed using known algorithms to recognize a rider on a motorcycle which can confirm the presence of the motorcycle detected via its sounds. In some embodiments, operation 77 can provide autonomous driving features that prevent the lane change in addition to providing a warning against lane changes.

In some embodiments, operation 77 can provide assisted driving features relative to pedestrians by detecting (from sounds from the sound sensors) the presence of pedestrians in the vicinity of the vehicle. In one embodiment, existing speech or voice recognition systems or algorithms can be used to detect the sound of pedestrians speaking. It is not necessary to recognize words in the speech but recognition of words (such as "stop") can be used in some embodiments to attempt to prevent a collision with the pedestrians. These existing speech or voice recognition systems can be trained using deep learning on specific sounds for which detection is desired. A vehicle can be localized for use in a country, and that localization can be used to select the appropriate speech recognition systems or algorithms. The detection of pedestrians can be used to cause other sensors to be activated such as cameras, radar sensors and/or a LIDAR sensor to perform assisted driving functions or features such as attempting to detect the location of the people and prevent a collision with the pedestrians.

In some embodiments, operation 77 can provide assisted driving features in situations involving weather such as snow or rain. For example, the sound of rain can be used to cause assisted driving features to be invoked in response to the rain. Rain hitting a surface such as the hood of a car produces a known sound that can be used to train algorithms or systems to recognize the sound of rain around the vehicle. In turn, the detection of rain through the detection of the sound of rain can invoke or alter assisted driving features. For example, the detection of rain from the sound of rain can be used to change the manner of operation of the braking system or steering system to adjust for potentially different road conditions or breaking conditions as a result of the rain or snow.

In one embodiment, the assisted driving feature in operation 77 is a warning which is displayed or otherwise presented to the driver indicating the estimated time of collision with an emergency vehicle. The warning can also include an indication on a display device of the direction of travel of the emergency vehicle in order to assist the driver in searching for the emergency vehicle. In one embodiment, the warning should provide sufficient time for the driver to redirect the vehicle to avoid an accident with the emergency vehicle. If the driver fails to heed the warning, an assisted driving function can provide autonomous driving to automatically control the vehicle to pull the vehicle over to the side of the road before the collision with the emergency vehicle. In one embodiment, the operation 77 can include reducing the volume of a media player or radio in the passenger compartment of the vehicle in order to allow the driver to hear the emergency vehicle's siren.

Figure 4A:
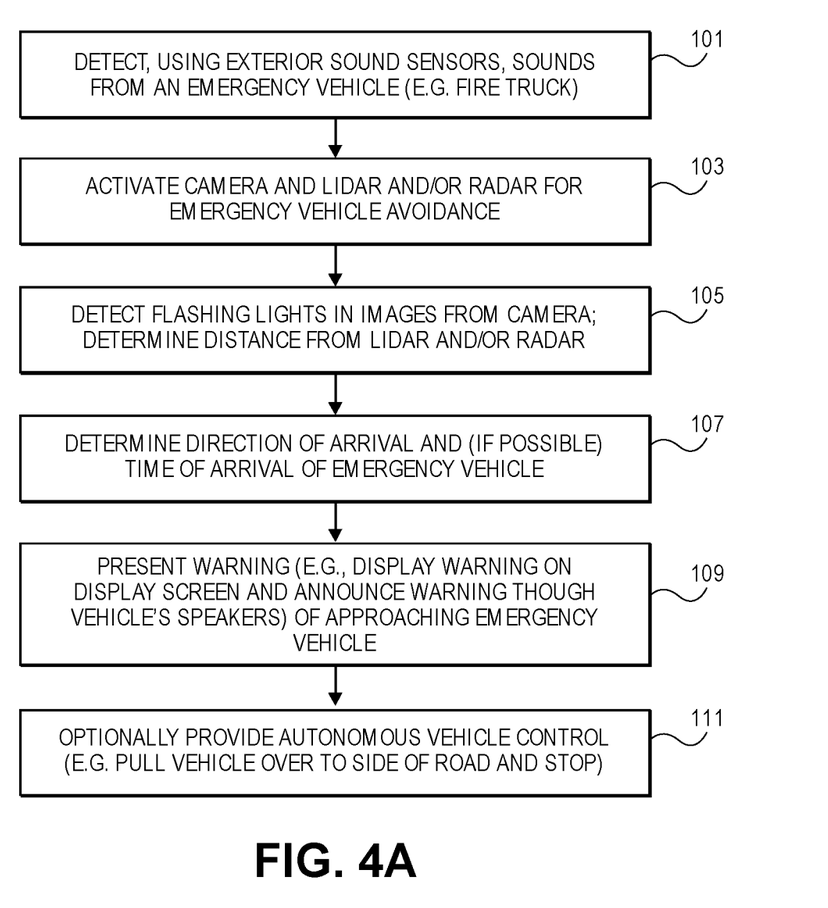
FIG. 4A (FIG. 4A) shows a flowchart which illustrates an example of a method according to one embodiment of the present invention.

FIG. 4A shows an example of a method according to one embodiment which can provide assisted driving functionality or features to avoid a collision with an emergency vehicle. In operation 101, the method detects, using exterior sound sensors, sounds from an emergency vehicle such as a fire truck. The exterior sound sensors can be a set of microphones arranged in an array on the exterior of the vehicle. In response to detecting and recognizing the sounds from an emergency vehicle, the vehicle can then activate one or more cameras and can activate a LIDAR sensor and can activate one or more radar sensors for an emergency vehicle avoidance. In one embodiment, the camera can be activated from a sleep state and the LIDAR can be activated from a sleep state. In another embodiment, the camera and a LIDAR sensor and radar sensors can normally be operating (not in a sleep state) as the vehicle is being driven, and the activation operation in operation 103 involves providing a notification to the camera sensors and the LIDAR sensor and the radar sensors that an emergency vehicle may be present in order to provide enhanced recognition in the processing algorithms which are designed to detect the presence of emergency vehicles. For example, this notification can be used to provide enhanced detection for emergency vehicles in images from the camera sensors or data from the LIDAR sensor or data from the radar sensors. One form that this enhanced detection can take is the detection of flashing lights in images which can be used to correlate with other sensor data in order to detect the presence of the emergency vehicle. For example, an image processing algorithm can be notified to confirm the presence of flashing lights in images that show the emergency vehicle. The image processing algorithm can scan multiple images taken successively over time to detect flashing lights by detecting lights in some but not all of the images of the same scene, and the image processing algorithm can provide an output, that confirms the presence of the flashing lights, to the one or more data processing systems. In operation 105, the vehicle, through one or more data processing systems detects the flashing lights in images from the camera and also determines the distance to the emergency vehicle using ranging data obtained from a LIDAR sensor and radar sensors. One or more data processing systems in the vehicle can in operation 107 determine the direction of arrival of the emergency vehicle and if possible also determine the time of arrival of the emergency vehicle. In one embodiment, the direction of arrival (of the source of the sound, such as the emergency vehicle) can be determined from a sparse component analysis derived from the sound data from the exterior sound sensors. In another embodiment the direction of travel can be derived or confirmed from images from the one or more cameras sensors. In another embodiment, the direction of travel can be derived or confirmed from the LIDAR data. In another embodiment, the direction of arrival and the time of arrival can be derived from a combination of sources. In one embodiment, the derivation of the direction and time of arrival can be based on the combination of sources, where each source can have an associated probability that indicates a level of confidence in the detection of an event and each source is one of the different types of sensors. For example, a sound recognition system, using the exterior sound sensors as a source to detect sounds, can provide an associated probability or level of confidence that it has detected a fire truck's siren coming from the right side of the vehicle's direction of travel, and this probability or level of confidence, when exceeding a threshold, can indicate the presence of the fire truck. Similarly, a camera sensor (which is another source) and image recognition system can provide an associated probability or level of confidence that has also detected a fire truck coming from the right side of the vehicle's direction of travel. When, in one embodiment, both of these events confirm each other and have a high level of confidence, the set of one or more processing systems can determine that a collision is likely. In this case, the one or more processing systems act as a centralized decision making system that receives multiple inputs and provides a decision concerning warnings and assisted driving functionality.

In operation 109, the vehicle presents a warning of the approaching emergency vehicle. The warning can be a warning on a display device in the vehicle and can also include a warning through the vehicle's one or more speakers. In one embodiment, if the driver does not heed the warning, the vehicle can optionally and automatically provide autonomous vehicle control in which the data processing system controls the motors and braking system of the vehicle in order to pull the vehicle over to the side of the road and to stop the vehicle. This is shown as operation 111 in FIG. 4A.

Figure 4B:
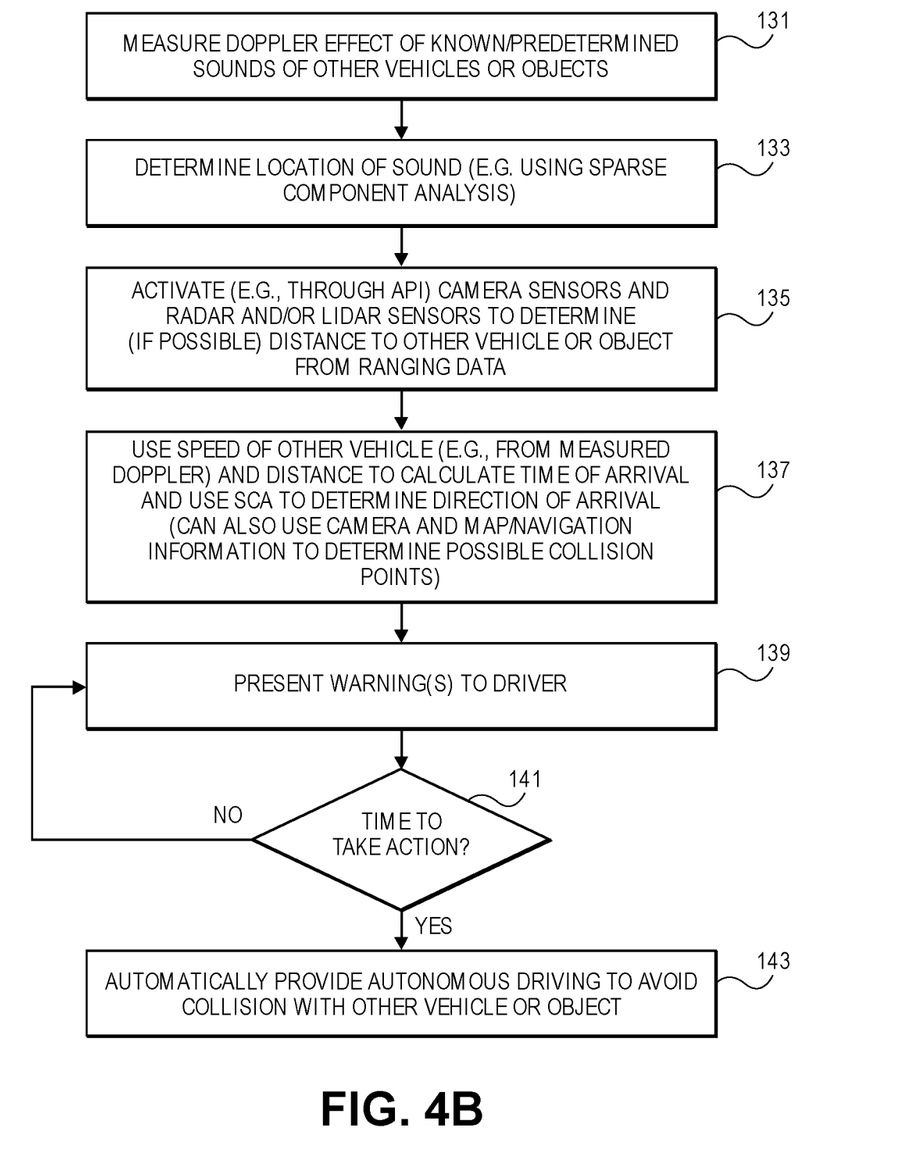
FIG. 4B (FIG. 4B) shows a flowchart which illustrates a method according to one embodiment described herein.

FIG. 4B shows an example of a more specific method according to one embodiment for using exterior sound sensors to provide assisted driving features or functionality. In operation 131, the vehicle can measure the Doppler effect (e.g. a shift of frequency from a known frequency to an observed frequency) of known or predetermined sounds of other vehicles or objects to determine the speed of the vehicle or object that is the source of the sound. For example the known frequencies of sirens of emergency vehicles can be used to determine or measure the Doppler effect of the sounds captured by the exterior sound sensors. In operation 133, the vehicle, through one or more data processing systems in the vehicle can determine the location of the sound source. For example, in one embodiment the use of sparse component analysis (SCA) can provide the location of the sound source based upon the different arrival times of a sound at different microphones in an array of microphones on the exterior surface of the vehicle. Examples of different arrays are shown in FIGS. 8A, 8B, and 8C and will be described further below. An example of SCA that can be used in one or more embodiments is described in: D. Pavlidi, A. Griffin, M. Puight, and A. Mouchtaris, "Real Time Multiple Sound Source Localization and Counting Using a Circular Microphone Array," in IEEE Transactions on Audio, Speech, and Language Processing, Vol. 21, No. 10, pp. 2193-2206, October 2013. In operation 135, the vehicle can activate (through, for example, an API) one or more camera sensors and radar sensors and a LIDAR sensor to confirm the presence of the other vehicle or objects such as an emergency vehicle and to determine if possible the distance to the emergency vehicle or other vehicle or object from ranging data from the LIDAR sensor and/or radar sensor(s). The activation can include notifying the camera sensors or LIDAR sensor or radar sensor to look in a specific direction indicated by the SCA or can include notifying the processing algorithms of the specific direction so the processing algorithms can begin their processing in that specific direction before processing data in other directions. In operation 137, the data processing systems in the vehicle can use the speed of the emergency vehicle or other vehicle and the distance of the emergency vehicle or other vehicle to calculate a time of arrival of the other vehicle. The distance can be determined from the ranging data, and the speed of the vehicle can be determined from the measured Doppler effect. Sparse component analysis can be used to determine the direction of arrival of the vehicle. In one embodiment, camera data and map and navigation information can also be used to determine a possible collision point based upon an intersection in the road. The vehicle can then provide in operation 139 a warning to the driver about a possible collision with an emergency vehicle or other vehicle or object. Then in operation 141 the vehicle can repeatedly determine whether it is time to autonomously take action in order to avoid a collision with the emergency vehicle or other vehicle or object. In one embodiment, the estimated time of collision with the emergency vehicle can be compared (in operation 141) to the amount of time required to pull the vehicle over and stop it along the side of the road. When the vehicle determines there will soon not be sufficient time to take action to pull the vehicle over to the side of the road it can proceed to operation 143 in which it automatically provides autonomous driving to avoid the collision with the emergency vehicle or other vehicle or object. For example, the one or more data processing systems on the vehicle can control the one or more motors and braking systems and steering system of the vehicle to cause the vehicle to be pulled to the side of the road and the stop the vehicle along the side of the road.

In the method of FIG. 4B, operation 131 is normally preceded by an operation that recognizes a known sound pattern and identifies the sound, such as a sound of a fire truck's siren; this recognition and identification can use the sound recognition systems or algorithms described herein to detect and recognize known and predetermined sounds. This recognition and identification can then determine the one or more known frequencies of those sounds and provide those one or more known frequencies to a Doppler shift processing system or algorithm to allow the determination of the Doppler shift form the known frequency (e.g. the known frequency of the fire truck's siren) to the observed frequency (e.g. the observed frequency of the fire truck's siren). In one embodiment, the set of processing systems in the vehicle can include a data structure that stores one or more known frequencies for each type of sound that the set of processing systems are configured to recognize and identify and once a sound is recognized and identified, the set processing of systems can retrieve the one or more frequencies for the recognized and identified sound. In one embodiment, the set of processing systems may use multiple frequencies within a particular siren to measure Doppler shift in order to measure an average Doppler shift across multiple frequencies. In one embodiment, operation 131 precedes operation 133 while in another embodiment, operation 131 follows operation 133 or is performed concurrently with operation 133. In one embodiment, operation 133 precedes operation 135 in order to determine a direction that can be used to prioritize image processing of images from cameras and a LIDAR sensor (e.g. look first or process first in the direction of the source of sound determined in operation 133).

The warning operation 139 can be in a variety of different formats and show a variety of different information. In one embodiment, the warning can be similar to the warning shown in FIG. 2. In another embodiment, the warning can include an indication of the direction of the approaching other vehicle such as an approaching emergency vehicle; this warning can be provided when the direction can be determined from one or more set of sensors (such as an array of microphone and/or camera sensors, etc.). A warning with a direction can specify the direction the other vehicle is approaching from such as one of: an approach from the right side of the vehicle or the left side of the vehicle or from behind the vehicle or from in front of the vehicle. In yet another embodiment, the warning can include a street map that shows the location on the street map of the vehicle and the other vehicle, and the street map can be similar to the view shown in FIG. 1 which allows the user of the vehicle to see the approach of the other vehicle such as the emergency vehicle 16 shown in FIG. 1. A warning with such a street map can be provided when the set of sensors (such as an array of microphones, a set of one or more cameras, and a LIDAR sensor and/or radar sensor) provide enough data to the set of one or more processing systems to enable the set of one or more processing systems to locate the other vehicle relative to the street map and place the other vehicle on the street map which also shows the vehicle having the set of sensors. The street map can be updated over time as the locations of the vehicle and the other vehicle change. Typically, radar sensors and a LIDAR can provide enough data in many instances to allow a location determination relative to a street map assuming the navigation system of the vehicle has determined the location and path of travel of the vehicle relative to the street map.

Figure 5:
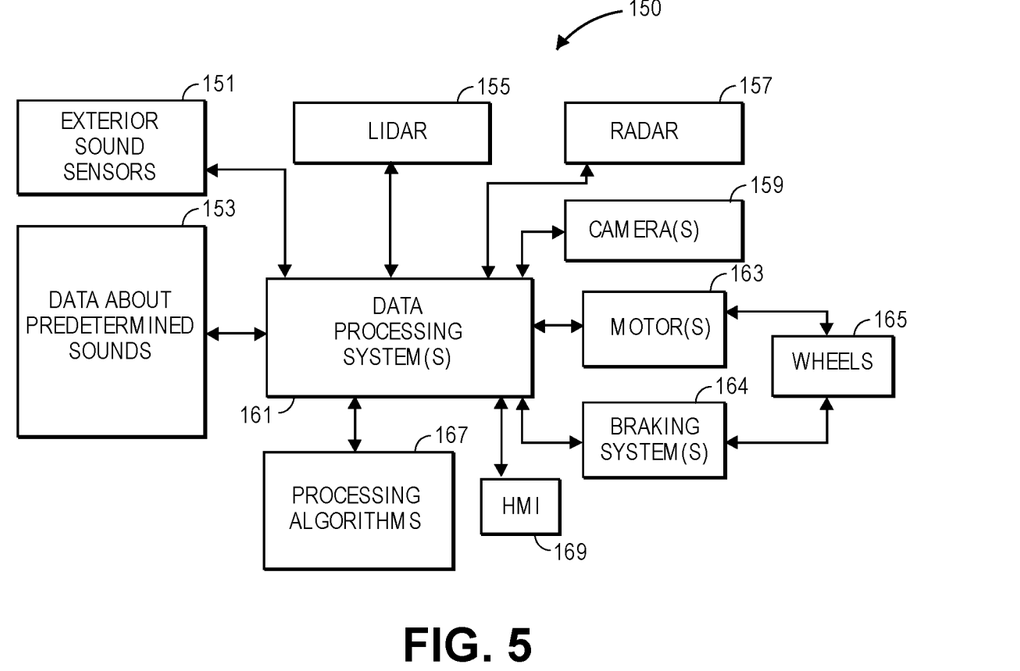
FIG. 5 (FIG. 5) is a block diagram of a vehicle which includes various components which can perform the one or more methods described herein.

FIG. 5 shows an example of the vehicle 150 which can be used in one or more embodiments described herein. The vehicle can be a car or SUV or other motorized vehicle which includes wheels 165 powered by one or more motors 163 and braked by one or more braking systems 164. The motors 163 can be one or more electric motors powered by one or more batteries or can be internal combustion engine(s) powered by a fuel such as gasoline, or can be other types of motors. The one or more motors 163 and the one or more braking systems 164 are coupled to the one or more data processing systems 161 which can control the operation of the motors 163 and the braking systems 164 in order to provide assisted driving features or autonomous driving functionality. In one embodiment, the data processing systems can be a set of data processing systems which provide redundancy for controlling the motors and the braking systems. In one embodiment, the data processing system 161 is coupled to one or more human machine interfaces 169 which can include one or more display devices (such as display device 50) also can include speakers within the cabin of the vehicle. The data processing systems 161 can also utilize processing algorithms 167 which can be stored in memory, such as flash memory or other nonvolatile memory coupled to the one or more data processing systems 161. In one embodiment, the processing algorithms 167 can include algorithms that perform sparse component analysis in order to determine the direction of the sound source and to localize the sound source using arrays of microphones. In another embodiment, the processing algorithms 167 can also include algorithms that provide Doppler measurements determined from sounds sampled from the exterior sound sensors 151. These Doppler measurements can measure a Doppler shift from a known frequency (such as a known frequency in a sound pattern of an emergency vehicle siren) to an observed frequency. Known and existing techniques can be used to perform these Doppler measurements from which the speed of the source of the sound can be determined. For example, Doppler measurements are described in the following web sites: www.jove.com/science-education/10411/sound-waves-and-doppler-shift; and www.phys.uconn.edu/~gibson/Notes/Section6_3/sec6_3.htm. The processing algorithms 167 can also include algorithms for image recognition to recognize images (e.g., flashing lights on emergency vehicles) from the one or more cameras 159 as well as algorithms to recognize data from the ranging data provided by radar sensors 157 and LIDAR sensor 155. The LIDAR sensor 155 and the one or more radar sensors 157 are coupled to the data processing systems 161 to provide data to the data processing systems which can calculate distances and other information about objects surrounding the vehicle 150. The one or more radar sensors 157 in one embodiment can use phase array antennas to enhance the ranging data from the radar sensors 157. A set of one or more exterior sound sensors 151 are also coupled to the one or more data processing systems 161 to provide data about sounds from the exterior of the vehicle 150. The sounds can include detected sounds from the sirens of emergency vehicles or other vehicles or objects such as pedestrians. In one embodiment, the vehicle 150 can also include data about predetermined sounds 153. In one embodiment, this data can be filter parameters for the siren frequencies of emergency vehicles. In another embodiment, this data 153 can be stored signatures of siren sounds which are used by processing algorithms to detect the sound of sirens of emergency vehicles.

Figure 6:
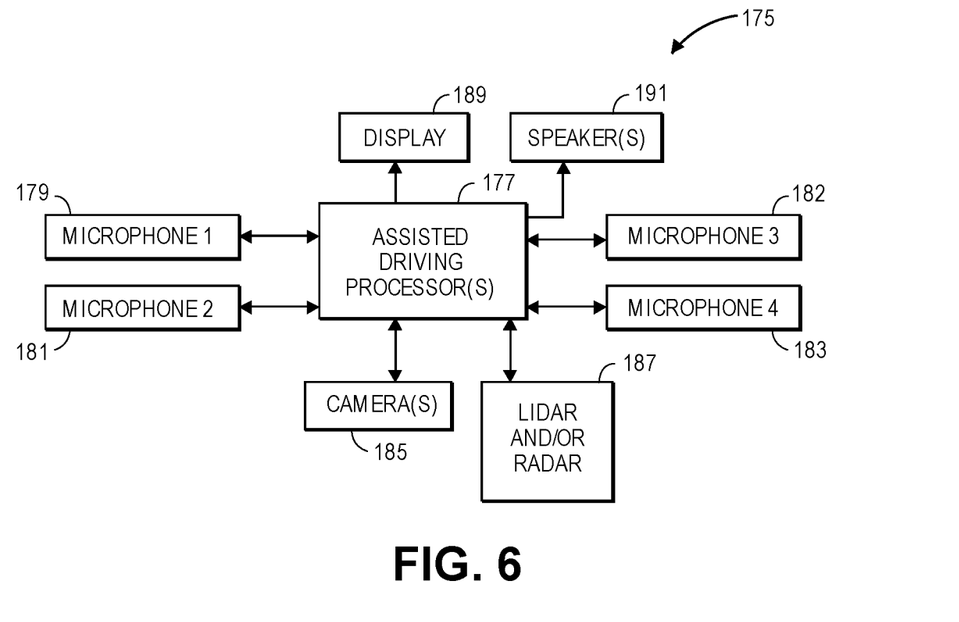
FIG. 6 (FIG. 6) is a block diagram of a system which can be used in a vehicle to provide the various embodiments described herein.

FIG. 6 shows another example of a data processing system which can be used in the vehicle, such as the vehicle 150. The data processing system 175 can include a set of microphones arranged on the exterior surface of the vehicle. In the example of FIG. 6 there are four microphones 179, 181, 182, and 183 arranged on the exterior surface of the vehicle. Each of these microphones is coupled to an assisted driving processor or a set of one or more assisted driving processors 177. These assisted driving processors 177 can perform sparse component analysis on the sound data from the microphones in order to determine the direction of the sound source or otherwise localize the sound of, for example, an emergency vehicle. The one or more assisted driving processors 177 can be coupled to a display device, such as a display 189 to present a warning on the display device that a collision with an emergency vehicle may occur shortly. In addition, the assisted driving processors 177 can be coupled to speakers within the passenger compartment of the vehicle, such as speakers 191, and these speakers can announce a warning which can be in addition to the display warning on the display device 189. In one embodiment, the one or more assisted driving processors 177 can be coupled to one or more cameras 185 to receive image data from the one or more cameras 185 and to process that image data to detect emergency vehicles from for example, the flashing lights on the emergency vehicles. Similarly, the one or more assisted driving processors 177 can be coupled to the LIDAR sensor 187 and/or to one or more radar sensors 187 to receive ranging data from these sensors in order to determine a distance to the emergency vehicle which can be used to calculate (based on the speed of the vehicle and the distance) the time of arrival of the emergency vehicle such as the time of arrival at an intersection which is soon to be crossed by the vehicle containing the data processing system 175.

Figure 7:
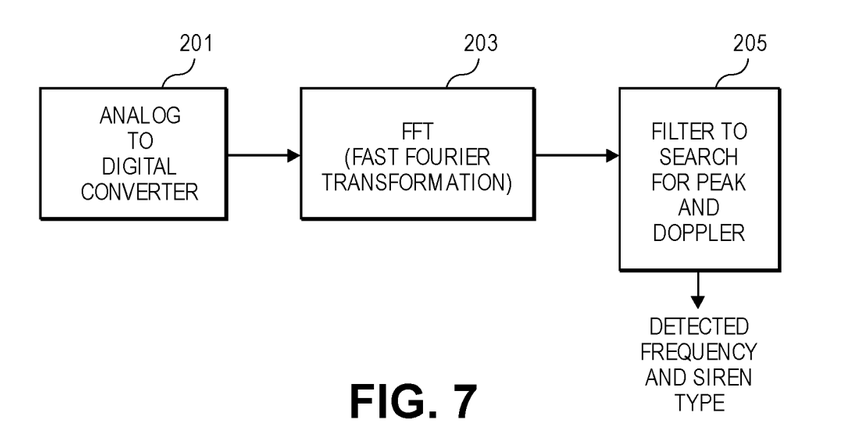
FIG. 7 (FIG. 7) shows an example of a specific system for providing for the detection of certain predetermined or known sounds (for example emergency sirens) which can be used in certain embodiments described herein.

FIG. 7 shows an example of an embodiment which can be used to detect the frequency and recognize siren type of emergency vehicles. In one embodiment, the system shown in FIG. 7 can be implemented in hardware components which can include an analog-to-digital converter 201 to convert the analog sounds into digital data which can then be provided to a Fast Fourier Transform device 203 which processes the digital sound data to derive data in the frequency domain which can then be searched to derive a detected frequency; the detected frequency can be compared to the known frequency for a particular siren to measure the Doppler effect which can be determined in filter 205, and the Doppler effect can be used to derive the speed of the emergency vehicle. In one embodiment, an algorithm described in the following reference can be used to estimate the Doppler of the received sounds: B. Soltanien, A. M. Demirtas, A. Shahed hagh ghadama, and M. Renfors, "Reduced-complexity FFT-based method for Doppler estimation in GNSS receivers", EURASIP Journal on Advances in Signal Processing, 2014(1), (1-15). In one embodiment, the vehicle can be configured with various frequencies of the various sirens around the world and when the vehicle is sold the dealer or user can localize the vehicle so that that vehicle uses the proper frequency values for use in the country where the vehicle was localized for use. The embodiment shown in FIG. 7 can be used as part of the vehicle 150 in FIG. 5 and can also be part of the assisted driving processor(s) 177 in FIG. 6.

FIG. 8A shows an example of a circular array of microphones. The circular array 250 includes eight microphones shown as microphones 251, 252, 253, 254, 255, 256, 257, and 258. The circular arrangement permits a processing system to determine the direction of a sound source and to localize the sound based on the different times of arrival of the sounds at the different positions of the microphones in the circular array of microphones. The circular array 250 can be arranged around the shark fin antenna that is commonly found on the roof of vehicles. FIG. 8B shows an example of a shark fin antenna 279 on a roof 277 of a vehicle 275. The microphone array can be a circular microphone array 281 arranged around the circular perimeter of the shark fin antenna 279. The circular array can have fewer or more microphones, such as the four microphones shown in FIG. 6.

FIG. 8C shows another example of an array of microphones. In the example shown in FIG. 8C, the vehicle 301 includes a front bumper 302 and a rear bumper 303. The vehicle 301 also includes a left side mirror 305 and a right side mirror 307. FIG. 8C shows a top view of the vehicle, and from the top view it can be seen that there are four microphones 310, 312, 314, and 316 arranged around the exterior surface of the vehicle 301 as shown in FIG. 8C.

At least some of the embodiments described herein can be considered to be a combination of several features that can include: (A) the use of a sound sensor or sound sensor array to recognize and identify a sound source (such as an emergency vehicle's siren) and optionally use one or more other sensors (e.g. a set of cameras or a LIDAR sensor) to confirm this identification; (B) the optional use of one or more sensors (such as sound sensor array of microphones or a LIDAR sensor or a set of camera sensors) to determine one or more of a direction or speed or location of the sound source; and (C) the optional use of the one or more sensors (such as the set of camera sensors, a LIDAR sensor, a radar sensor, and ultrasonic sensor(s)) to provide assisted driving functionality (e.g. warnings or guidance to pull the vehicle over to side of road) or to provide autonomous driving to maneuver the vehicle, through automatic control of the vehicle's motor(s), brakes, and steering by the set of one or more processing systems, to avoid a collision by, for example, stopping the vehicle along the side of a road. Each of these features has multiple implementations as described, and these multiple implementations can be combined with any one or the multiple implementations of the other features. Although certain embodiments are described in this specification and are enumerated in the claims, it will be appreciated that these certain embodiments can be combined or modified, in whole or in part, into various different combinations. The combinations of these embodiments can be any one of all possible combinations of the implementations of the features A, B, and C.

It will be apparent from this description that embodiments and aspects of the present invention may be embodied, at least in part, in software. That is, the techniques may be carried out in a set of one or more data processing systems in response to its processor(s) executing a sequence of instructions contained in a storage medium, such as a non-transitory machine-readable storage medium (e.g. volatile DRAM or non-volatile flash memory). In various embodiments, hardwired circuitry (e.g. special purpose hardware) may be used in combination with software instructions to implement the present invention. Thus the techniques are not limited to any specific combination of hardware circuitry and software, or to any particular source for the instructions executed by the set of one or more data processing systems.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A vehicle comprising;
a processing system;
a set of one or more sound sensors coupled to the processing system, the sound sensors configured to receive sounds from an exterior of the vehicle;
a set of wheels;
a set of one or more motors coupled to the set of wheels and coupled to the processing system;
a set of one or more brakes coupled to the set of one or more wheels and to the processing system; and
the processing system being configured to:
  receive data from the set of one or more sound sensors about sounds from the exterior of the vehicle,
  process the received data to determine that a presence of an object has been detected,
  in response to determining that the object has been detected, activate one or more additional types of sensors to:
  confirm the presence of the object; and
  determine a distance of the object from the vehicle and a velocity of the object; and
  determine, based on the distance and velocity of the object, whether a time until collision with the object is less than a threshold time to collision; and
  in response to determining that the time until collision with the object is less than the threshold time, provide assisted driving capabilities for the vehicle to avoid the collision; and
  use data representing sounds of additional vehicles that may collide with the vehicle to recognize a source of the sounds of the additional vehicles and to identify the additional vehicles and use data representing sounds associated with one or more of weather or people or animals, wherein a sound of rain, when recognized, causes the processing system to initiate use of an emergency anti-locking braking system.

2. The vehicle as in claim 1 the set of sound sensors including at least one microphone and the assisted driving capabilities include one or more of: one or more warnings or autonomous driving of the vehicle and wherein the processing system includes a plurality of processors and associated memory and non-volatile storage.

3. The vehicle as in claim 1 the set of sound sensors including a set of microphones arranged on the vehicle to provide reception of sounds from around the exterior of the vehicle and the processing system is to determine a type of a source of sounds by recognizing the sounds or is to identify the source of the sounds by recognizing the sounds.

4. The vehicle as in claim 1 the assisted driving capabilities including stopping the vehicle or changing a direction of travel of the vehicle in response to determining a collision with another vehicle will occur or warning against a lane change.

5. The vehicle as in claim 1 the data representing sounds of vehicles including country specific representations of sounds of emergency vehicles for a set of one or more countries and the vehicle is localized for use in a country.

6. The vehicle as in claim 5 the processing system to recognize sounds of emergency vehicles to identify a set of one or more frequencies that are used to determine Doppler shift of the frequencies and the processing system is to determine a Doppler effect from the data representing sounds of emergency vehicles to determine a speed of an emergency vehicle.

7. The vehicle as in claim 6 the assisted driving capabilities including at least one of: generating a warning to a driver of the vehicle; reducing a volume of a media player in a passenger cabin of the vehicle; reducing the speed of the vehicle; or stopping the vehicle along a side of a road.

8. The vehicle as in claim 7, the one or more additional types of sensors comprising:
   a set of one or more cameras coupled to the processing system to capture images of a surrounding environment of the vehicle;
   a set of one or more radars sensors or a LIDAR sensor coupled to the processing system to capture ranging data of the surrounding environment of the vehicle; and
   the processing system using the captured images from the set of one or more cameras and uses ranging data from the set of one or more radar sensors or the LIDAR sensor to determine whether another vehicle will collide with the vehicle and to determine a distance of the another vehicle.

9. The vehicle as in claim 8 the set of one or more cameras configured to capture lights from an emergency vehicle and the processing system detects the lights in the captured images.

10. The vehicle as in claim 8 the processing system to determine a delay in sounds at different sounds sensors arranged around the exterior of the vehicle to determine a direction of another vehicle.

11. The vehicle as in claim 7 the warning including a warning that indicates a direction of travel of another vehicle.

12. The vehicle as in claim 1 the set of one or more sound sensors being arranged in a circular or linear arrangement on the exterior of the vehicle.

13. The vehicle as in claim 12 the set of one or more sound sensors to provide data used by the processing system to estimate a direction of arrival of another vehicle.

14. The vehicle as in claim 13 the estimate of the direction of arrival being determined from a sparse component analysis based on data from the set of one or more sound sensors.

15. The vehicle as in claim 1 the additional vehicles including motorcycles and the sounds of additional vehicles including sounds of one or more motorcycles.

16. The vehicle as in claim 1 the sounds of additional vehicles including sounds of one or more motorcycles and wherein the processing system is configured to warn against lane changes if a sound of a motorcycle is detected through the set of one or more sound sensors.

17. The vehicle as in claim 6 the processing system to use noise canceling to cancel noise, from inside the vehicle, in the data from the set of one or more sound sensors.

18. The vehicle as in claim 1, the vehicle further comprising:
   a set of one or more cameras coupled to the processing system, the set of one or more cameras to capture images of a surrounding environment of the vehicle; and
   the processing system to use the captured images from the set of one or more cameras and uses the data from the set of one or more sound sensors to provide assisted driving functionality for the vehicle in response to a result of processing the captured images and the data from the set of one or more sound sensors.

19. The vehicle as in claim 18 the assisted driving functionality includes determining whether another vehicle will collide with the vehicle, and the set of one or more cameras to capture lights from an emergency vehicle.

20. The vehicle as in claim 1, the vehicle further comprising:
   a ranging sensor comprising at least one of a radar sensor or a LIDAR sensor coupled to the processing system, the ranging sensor to capture ranging data of a surrounding environment of the vehicle; and
   the processing system to use the captured ranging data and uses the data from the set of one or more sound sensors to provide assisted driving functionality for the vehicle in response to the result of processing the captured ranging data and the data from the set of one or more sound sensors.

21. The vehicle as in claim 20 the assisted driving functionality to determine whether another vehicle will collide with the vehicle.

22. A data processing system for use in a vehicle, the data processing system comprising:
   a processing system;
   a set of one or more sound sensors coupled to the processing system, the sound sensors configured to receive sounds from an exterior of the vehicle;
   a display coupled to the processing system;
   an audio output system coupled to the processing system;
   a memory storing executable program instructions to be executed by the processing system, the processing system being configured to:
   receive data from one or more sound sensors,
   process the received data to determine that a presence of an object has been detected,
   in response to determining that the object has been detected, activate one or more additional types of sensors to:
   confirm the presence of the object;
   determine a distance of the object from the vehicle and a velocity of the object; and
   determine, based on the distance and velocity of the object, whether a time until collision with the object is less than a threshold time to collision; and
   in response to determining that the time until collision with the object is less than the threshold time, provide assisted driving capabilities for the vehicle to avoid collision with the object; and
   use data representing sounds of additional vehicles that may collide with the vehicle to recognize a source of the sounds of the additional vehicles and to identify the additional vehicles and use data representing sounds associated with one or more of weather or people or animals, wherein a sound of rain, when recognized, causes the processing system to initiate use of an emergency anti-locking braking system.

23. The processing system of claim 22, the processing system to generate a warning through the display and audio output system in response to data from the set of one or more sound sensors indicating an imminent collision.

24. The processing system of claim 23 the processing system being coupled to a media player that generates audio output in a passenger cabin of the vehicle, and the processing system to reduce a volume of the audio output in response to detecting a possible collision based upon the data from the set of one or more sound sensors.

* * * * *